US005605597A

United States Patent [19]

Plenzler

[11] Patent Number: 5,605,597

[45] Date of Patent: Feb. 25, 1997

[54] METHOD AND APPARATUS FOR APPLYING PRESSURE SENSITIVE LABELS TO HOLLOW CONTAINERS

[75] Inventor: John A. Plenzler, Sylvania, Ohio

[73] Assignee: Owens-Illinois Plastic Products Inc., Toledo, Ohio

[21] Appl. No.: 338,064

[22] Filed: Nov. 14, 1994

[51] Int. Cl.[6] .......... B32B 31/00

[52] U.S. Cl. .......... 156/499; 156/542; 156/566; 156/497

[58] Field of Search .......... 156/542, 540, 156/566, 320, 499, 322, 359, 497

[56] References Cited

U.S. PATENT DOCUMENTS

| | | | |
|---|---|---|---|
| Re. 23,512 | 6/1952 | Von Hofe | 156/320 |
| 2,538,520 | 1/1951 | Holt . | |
| 2,623,444 | 12/1952 | Maier . | |
| 2,776,606 | 1/1957 | Fischer . | |
| 2,790,480 | 4/1957 | Lithio . | |
| 2,920,780 | 1/1960 | Hauschild et al. | 156/542 X |
| 3,301,733 | 1/1967 | West et al. | 156/542 X |
| 3,434,902 | 3/1969 | Bliss | 156/542 X |
| 3,450,590 | 6/1969 | La Mers | 156/540 |
| 3,984,273 | 10/1976 | Said . | |
| 4,037,006 | 7/1977 | Roberts et al. | 156/201 X |
| 4,181,558 | 1/1980 | Neubronner | 156/359 X |
| 4,392,905 | 7/1983 | Boyd . | |
| 4,427,744 | 1/1984 | Hume, III . | |
| 4,468,274 | 8/1984 | Adachi . | |
| 4,666,536 | 5/1987 | Van Erden et al. | 156/202 X |
| 4,834,826 | 5/1989 | Abe et al. | 156/497 X |
| 4,985,274 | 1/1991 | Wright . | |
| 5,019,203 | 5/1991 | Singer . | |
| 5,021,111 | 6/1991 | Swenson . | |
| 5,064,492 | 11/1991 | Friesch . | |
| 5,078,592 | 1/1992 | Grimshaw et al. | 156/359 X |
| 5,143,961 | 9/1992 | Scholl et al. . | |
| 5,250,129 | 10/1993 | Twele | 156/542 X |
| 5,277,741 | 1/1994 | Kramer | 156/542 X |
| 5,486,259 | 1/1996 | Goodwin et al. | 156/384 |

*Primary Examiner*—David A. Simmons
*Assistant Examiner*—Paul M. Rivard

[57] ABSTRACT

In a method for applying pressure sensitive labels to products such as hollow articles by moving the label carried on a label web and providing for an acute bend of the label web to transfer the label to a hollow article, the improvement comprises heating said label directly to elevate the temperature above ambient temperature before the acute bend to warm the label sufficiently to permit the pressure sensitive adhesive on the label to flow sufficiently to enter the microscopic surfaces of the hollow article. In one form, the heating comprises directing warm air directly against the label while it is on the label web. In another form, heating said label comprises providing a heating plate in direct contact with the label web on the surface of the label web opposite to that on which said label is carried. The apparatus comprises means in advance of the acute bend for heating said label while it is carried by the label web directly to elevate the temperature above ambient temperature before the acute bend to warm the label sufficiently to permit the pressure sensitive adhesive on the label to flow sufficiently to enter the microscopic surface irregularities of the surfaces of the hollow article. In one form, the heating means comprises plenum means for directing warm air directly against the label while it is on the label web. In another form the heating means comprises a heating plate means in direct contact with the label web on the surface of the label web opposite to that on which said label is carried. The apparatus includes means for moving the heating plate means into and out of contact with the web.

1 Claim, 4 Drawing Sheets

METHOD AND APPARATUS FOR APPLYING PRESSURE SENSITIVE LABELS TO HOLLOW CONTAINERS

This invention relates to applying pressure sensitive labels to hollow containers.

BACKGROUND AND SUMMARY OF THE INVENTION

In applying pressure sensitive labels to hollow containers, it has been well known to carry the pressure sensitive labels on a web that is moved past a peel plate. The peel plate includes internal heaters which heat the labels from one side which attempts to provide sufficient heat in the short period of time that the label is in contact with the peel plate. Such an arrangement has a further disadvantage in that when the labeling apparatus is not running, the label is lying against the hot peel plate and the label may be heated excessively.

A typical patent directed to such practices is U.S. Pat. No. 4,468,274.

Among the objectives of the invention are to provide a method and apparatus for heating pressure sensitive labels and applying the labels to a container wherein the label is uniformly heated; wherein the application of the heat can be readily interrupted as needed; and wherein the method and apparatus can be applied to conventional labeling systems.

In accordance with the invention for applying pressure sensitive labels to hollow containers by moving the labels carried on a label web and providing for an acute bend on the label web to transfer the label to a hollow article, the improvement comprises heating said label directly to elevate the temperature above ambient temperature before the acute bend to warm the label sufficiently to permit the pressure sensitive adhesive on the label to flow sufficiently to enter the microscopic surfaces of the hollow article. In one form, the heating comprises directing warm air directly against the label while it is on the label web. In another form, heating said label comprises providing a heating plate in direct contact with the label web on the surface of the label web opposite to that on which said label is carried.

In accordance with the invention, an apparatus for applying a pressure sensitive label to a hollow container wherein the label, carried on a label web, is moved about an acute bend to transfer the label to a hollow article. The apparatus comprises means in advance of the acute bend for heating the labels, while they are carried by the label web, directly to elevate the temperature above ambient temperature to warm the label sufficiently to permit the pressure sensitive adhesive on the label to flow sufficiently to enter the microscopic surface irregularities of the hollow article. In one form, the heating means comprises a plenum means for directing warm air directly against the label while it is on the label web. In another form the heating means comprises a heating plate means in direct contact with the label web on the surface of the label web opposite to that on which said label is carried. The apparatus includes means for moving the heating plate means into and out of contact with the web.

DETAILED DESCRIPTION OF THE PREFERRED EMBODIMENTS

Figure 1:
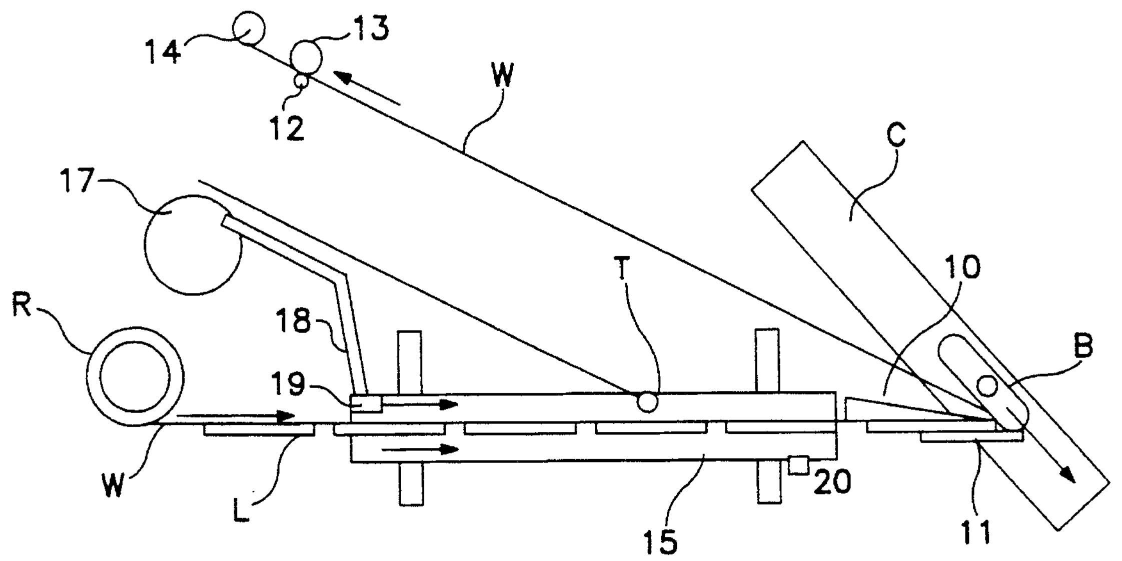
FIG. 1 is a diagrammatic top plan view of an apparatus embodying the invention.
Figure 2:
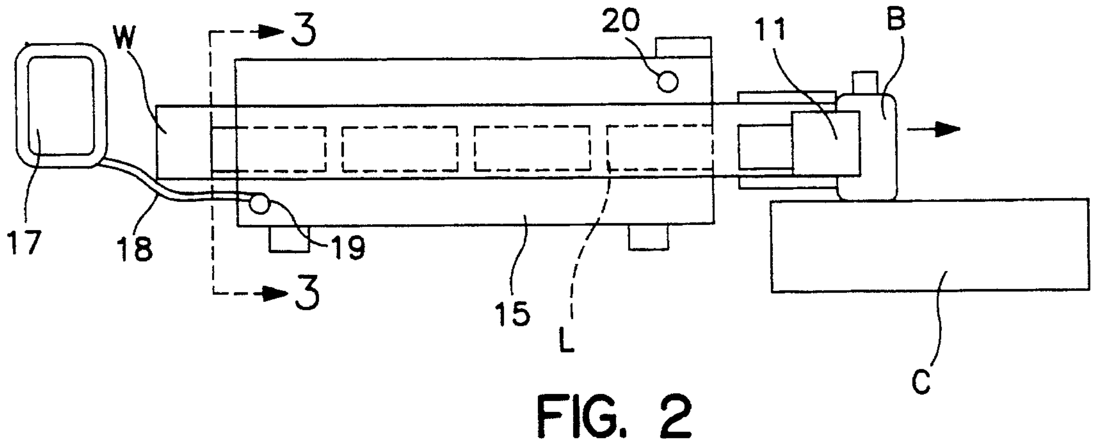
FIG. 2 is a front elevational view of the apparatus shown in FIG. 1.

Referring to FIGS. 1 and 2 the general apparatus for applying a pressure sensitive label is shown and includes a supply roll R that provides a web W carrying pressure sensitive labels L past a peel plate 10 where the web changes in direction and applies the pressure sensitive label to a bottle or container B. A squeegee 11 applies a pressure to the label to conform the label to the bottle B. The web is then carried between a nip roller 12 and drive roller 13 to a rewind roller 14.

Figure 3:
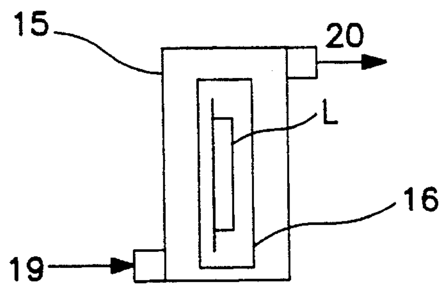
FIG. 3 is a sectional view taken along line 3—3 in FIG. 2.

In accordance with the invention, a plenum 15 is provided in the path of the web W carrying labels L in advance of the peel plate 10 and the web passes through a slit 16 in one end of the plenum 15 and is heated by heated air from a temperature controlled blower 17 connected by hose 18 to an inlet 19 so that the air flows about the label L and out through an outlet 20 (FIG. 3).

Specifically, temperature controlled heated air is supplied by the blower to the plenum 15 at inlet 19. Air leaves the plenum 15 outlet at 20. The label L and liner or web W enters the plenum 15 thru the slit 16. The heated air warms the label L as it passes thru the plenum 15. Label adhesive on label L is warmed as label L and web W pass thru the plenum 15. Label L and liner leave the plenum thru a slit at the other end.

Referring to FIGS. 4–8 in the modified form of apparatus shown in these drawings, a heated plate 21 is provided in overlying relationship to the side of the web W opposite to that on which the labels L are positioned and is movable into and out of position by a cylinder 22.

Labels L are on the web on the supply roll and are pulled across peel plate 10 by the drive roller 13. The web W moves across heated plate 21. As long as heated plate 21 is not in contact with the liner, no conductive heating occurs. Heating of the plate 21 is achieved by use of heaters 23 inserted into the plate 21. Heaters 23 are controlled by a typical temperature controller 24 that utilizes a thermocouple T to sense the plate temperature. Controller turns heaters 23 on and off as needed to maintain the desired temperature of the plate.

When cylinder 22 is activated the heated surface of plate 21 makes contact with the label web W. Heat is conducted thru the web W to the label adhesive. The web is pulled by the drive roller 13 across the peel plate 10. The label L is removed from the web W and is applied to the bottle B. Current common practice uses a flexible pad called a squeegee 11 to push label into contact with the bottle. Rollers and fibrous brushes may also be used to push label into contact with the bottle. The liner W is then pinched between the drive roller 13 and nip roller 12 and then received onto the rewind roll 14.

Figure 4:
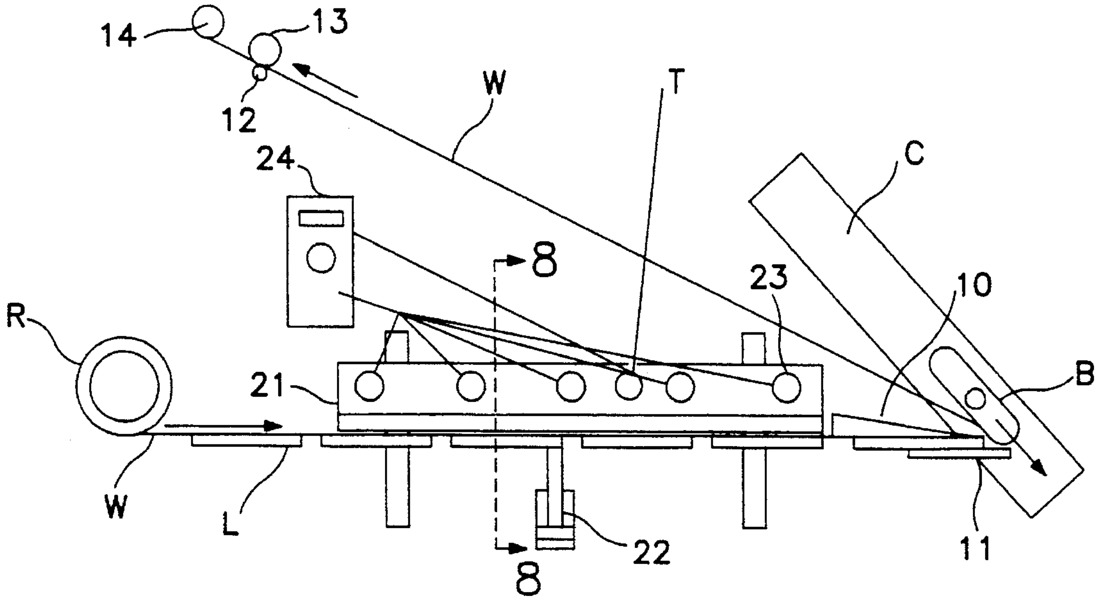
FIG. 4 is a diagrammatic top plan view of a modified form of an apparatus.
Figure 5:
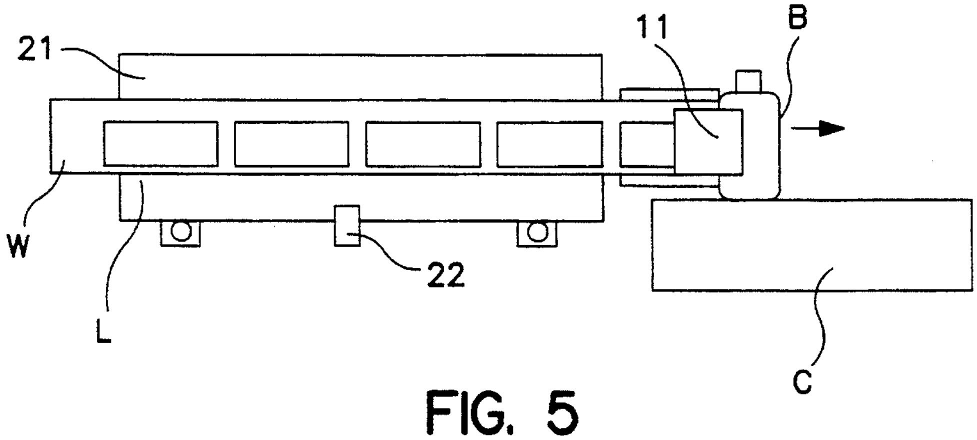
FIG. 5 is a front elevational view of the apparatus as shown in FIG. 4.
Figure 6:
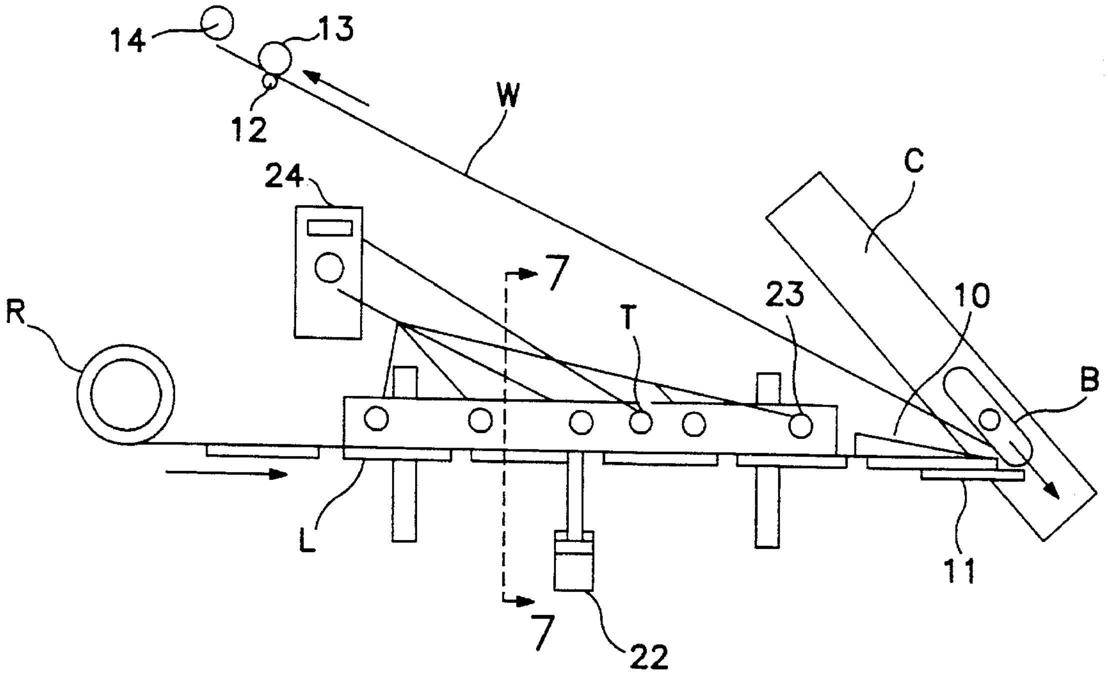
FIG. 6 is a view similar to FIG. 4 showing the parts in a different operative position.
Figure 7:
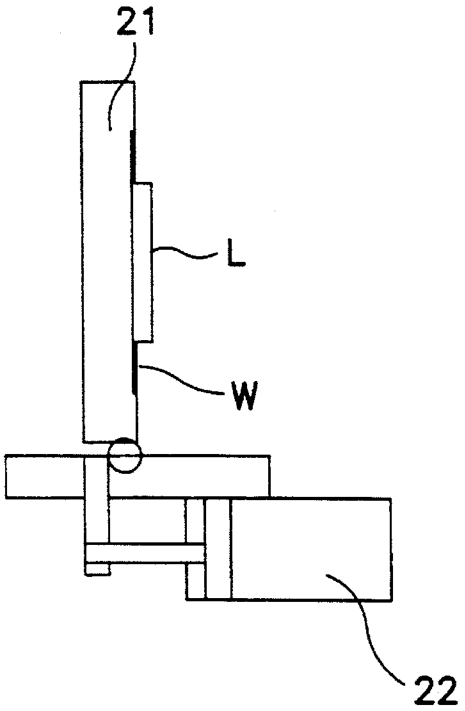
FIG. 7 is a sectional view taken along the line 7—7 in FIG. 6.
Figure 8:
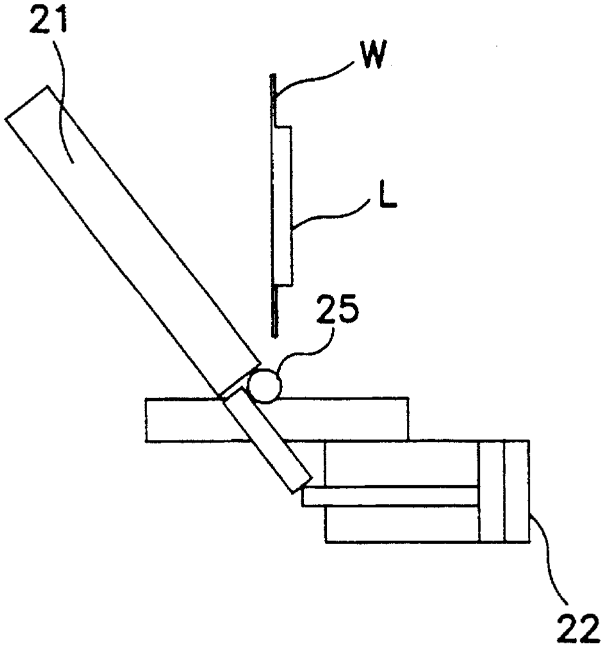
FIG. 8 is a sectional view taken along the line 8—8 in FIG. 4.

FIGS. 4, 6, 7 and 8 show a heating plate in retracted and engaged position. Plate 21 is hinged and rotates about hinge pin 25. Cylinder piston 22 extends and retracts to pivot heating plate 21 to and away from contact with liner. When in contact with the liner, the label adhesive is heated to a controlled temperature (FIGS. 6 and 7). FIGS. 4 and 8 show the liner out of contact with the plate.

It can thus be seen that there has been provided a method and apparatus for applying pressure sensitive labels to hollow containers by moving the labels carried on a label web and providing for an acute bend of the label web to transfer the label to a hollow article. The improvement comprises heating said label directly to elevate the temperature above ambient temperature before the acute bend to warm the label sufficiently to permit the pressure sensitive adhesive on the label to flow sufficiently to enter the microscopic surfaces of the hollow article. In one form, the heating comprises directing warm air directly against the label while it is on the label web. In another form, heating said label comprises providing a heating plate in direct contact with the label web on the surface of the label web opposite to that on which said label is carried. The entire process can be repeated to apply a label to the other side of the hollow article.

Although the invention has been described as being applicable to hollow articles, it is also applicable to solid articles.

What is claimed is:

1. In an apparatus for applying pressure sensitive labels to articles such as hollow containers wherein the label is carried on a label web and the label web is moved about an acute bend on the label web to transfer the label to a hollow article, the improvement comprising heating means spaced from and in advance of the acute bend for simultaneously heating a plurality of labels as they are moved by the web toward the acute bend to heat each said pressure sensitive label while it is carried by the label web directly to elevate the label temperature above ambient temperature before the acute bend to warm the label sufficiently to permit the pressure sensitive adhesive on the label to enter microscopic irregularities of the surface of the hollow article, said heating means comprising means mounted on said apparatus for directing warm air lengthwise of the label web directly and simultaneously against a plurality of labels as they are moved by the web toward the acute bend to heat each label while it is on the label web, said heating means for heating said labels comprising heating plate means mounted on said apparatus and spaced from and in advance of the acute bend in direct contact with the label web on the surface of the label web opposite to that on which said label is carried by the web, the length of said heating plate being such that a plurality of labels are simultaneously heated as they are moved toward the acute bend, means for moving said heating plate means on said apparatus for movement into and out of contact with said web, said means for moving said heating plate means comprising means hinging said heating plate means for movement into and out of contact with said web and cylinder means for moving said plate means.

* * * * *